United States Patent
Koch et al.

[11] Patent Number: 5,417,831
[45] Date of Patent: May 23, 1995

[54] SOLID ELECTROLYTE HAVING A MULTI-LAYER ELECTRODE APPLIED THERETO

[75] Inventors: Alfred Koch, Meersburg; Wolfgang Schaefer, Friedrichshafen; Rainer Schmidberger, Markdorf; Detlef Stolten, Uhldingen, all of Germany

[73] Assignee: Dornier GmbH, Friedrichshafen, Germany

[21] Appl. No.: 148,273

[22] Filed: Nov. 8, 1993

[30] Foreign Application Priority Data

Nov. 6, 1992 [DE] Germany ............ 42 37 519.3

[51] Int. Cl.⁶ .................................. C25B 9/00
[52] U.S. Cl. ................................. 204/283
[58] Field of Search ............ 204/282, 283, 295; 420/30, 33, 41

[56] References Cited

U.S. PATENT DOCUMENTS

| | | | |
|---|---|---|---|
| 3,578,502 | 5/1971 | Tannenberger et al. | 136/120 |
| 4,296,148 | 10/1981 | Friese | 427/125 |
| 4,354,912 | 10/1982 | Friese | 204/195 S |
| 4,789,561 | 12/1988 | Schäefer et al. | 427/126.1 |
| 5,089,455 | 2/1992 | Ketcham et al. | 501/104 |
| 5,273,837 | 12/1993 | Aitken et al. | 429/3 D |

FOREIGN PATENT DOCUMENTS

| | | |
|---|---|---|
| 1671704 | 9/1971 | Germany . |
| 1771829 | 2/1972 | Germany . |
| 2852647 | 6/1980 | Germany . |
| 2904069 | 8/1980 | Germany . |
| 3611291 | 10/1987 | Germany . |
| 3922673 | 1/1991 | Germany . |
| 3935310 | 4/1991 | Germany . |
| 4136448 | 9/1992 | Germany . |
| 1170046 | 11/1969 | United Kingdom .......... 429/33 |

*Primary Examiner*—Kathryn Gorgos
*Attorney, Agent, or Firm*—Evenson, McKeown, Edwards & Lenahan

[57] ABSTRACT

A solid electrolyte with a multi-layer electrode applied to it. This multi-layer construction prevents electrochemical decomposition reactions which limit the durability and length of service life of conventional electrodes.

9 Claims, 2 Drawing Sheets

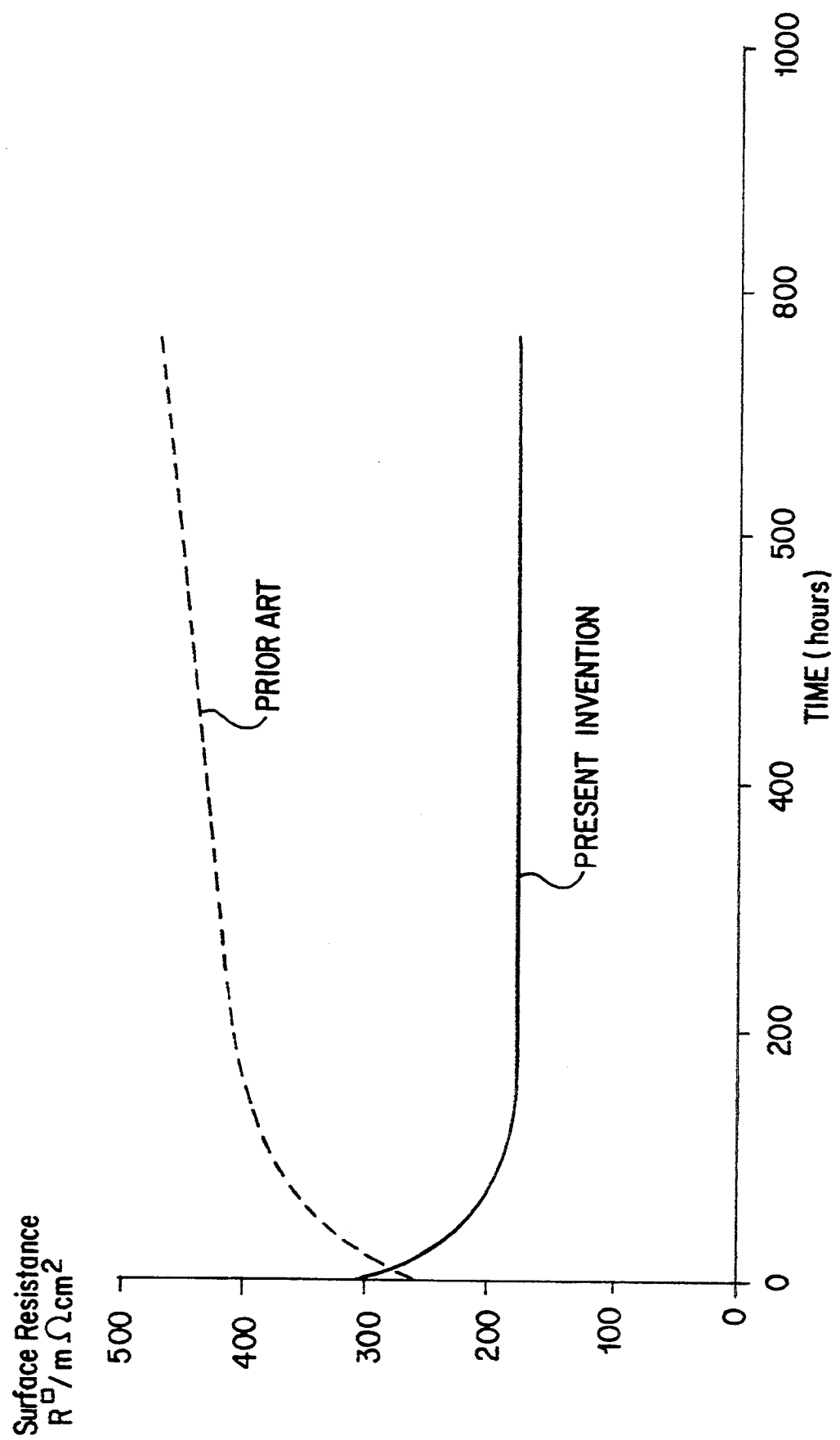

SOLID ELECTROLYTE HAVING A MULTI-LAYER ELECTRODE APPLIED THERETO

BACKGROUND OF THE INVENTION

This invention relates to a solid electrolyte for high-temperature electrolysis having a multi-layer electrode applied thereto.

High-temperature electrolyzers are electrochemical converters which generate hydrogen from water vapor while using electrical energy with a high efficiency. A basic diagram of such an electrolyzer is shown in FIG. 1. Because their efficiency is greater than 90%, such devices are very important for a future hydrogen energy management cycle which is based on non-fossil primary energy sources, such as solar and nuclear energy. It is contemplated that the hydrogen from such systems may be used to replace previously used storable fossil fuel energy carriers, such as natural gas, gasoline, diesel oil, etc.

With respect to economic efficiency and high energy density, a planar cell design is advantageous. In such an arrangement, thin solid electrolytic plates are coated on both sides with porous electrodes, and the coated plates are stacked alternately with connecting elements above one another so that a bipolar arrangement is created. Several individual cells may be connected in series. The operating temperature is approximately 800° to 1,000° C.

The aforementioned high-temperature electrolyzer arrangements may also be used for the reverse process of fuel cell operation in order to produce electric energy with a high degree of efficiency from fuel gases such as hydrogen, carbon monoxide or methane.

The following materials are known for use as components of the high-temperature electrolyzers:

Oxygen Electrode (Air Electrode):
  Doped oxides with a perovskite structure such as $La_{1-x}Ca_xMnO_3$, $La_{1-x}Sr_xMnO_3$ or 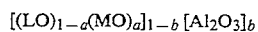 $La_{1-x}Sr_{x-}Co_yMn_{1-y}O_3$.

Electrolyte:
  Partially or fully stabilized $ZrO_2$ doped with CaO—, MgO—, $Y_2O_3$— or other rare-earth oxide.

Hydrogen Electrode (Fuel Gas Electrode):
  Ceramic/metal composite materials with nickel or cobalt as the metallic component and doped $CeO_2$ or $ZrO_2$ as the ceramic component.

Connecting Element:
  Doped lanthanum chromite such as $La_{1-x}Sr_xCrO_3$ or $LaMg_xCr_{1-x}O_3$.

Solid electrolytes of fully or partially stabilized $ZrO_2$ with additions of $Al_2O_3$ are known from German Patent No. DE 2,852,647 C2 and Examined German Patent Application No. DE 1,671,704 B2. Oxygen electrodes made of an electronically conductive oxidic material are known from Published German Patent Application Nos. DE 4,136,448 A1 and DE 3,935,310 A1.

Fuel gas electrodes made of a ceramic/metal particle composite material are also known from Published German Patent Application Nos. DE 39 35 310 A1 and DE 39 22 673 A1. Examined German Patent Application No. DE 17 71 829 B2, discloses a multi-layer electrode on a solid electrolyte in the case of which the layer which is adjacent to the solid electrolyte consists of individual grains made of partially or fully stabilized $ZrO_2$.

A solid electrolyte made of partially or fully stabilized $ZrO_2$ with $Y_2O_3$ doping and an addition of $Al_2O_3$ is described in Published German Patent Application No. DE 2,904,069 A1. The associated oxygen electrode consists of an oxidic material. This combination of the electrode and the solid electrolyte represents a starting point for the present invention. Published German Patent Application No. DE 29 04 069 A1, discloses an arrangement in which an intermediate layer of fully stabilized $ZrO_2$ with $Al_2O_3$ is disposed between the electrode and the solid electrolyte.

Despite all the efforts of the prior art, there remains a need for improved solid electrolytes with attached multi-layer electrodes.

SUMMARY OF THE INVENTION

It is the object of the present invention to provide a solid electrolyte of the aforementioned type which has an electrode (oxygen electrode or fuel gas electrode) applied to it and which achieves increased durability and an extended operating life of the electrode.

This object is achieved by providing a combination comprising a solid electrolyte for high-temperature electrolysis having a molar composition corresponding to the formula:

$$[(LO)_{1-a}(MO)_a]_{1-b}[Al_2O_3]_b$$

wherein LO represents $ZrO_2$, $HfO_2$ or a mixture of $ZrO_2$ and $HfO_2$, MO represents an oxide selected from the group consisting of CaO, MgO and rare earth oxides, and $0.03 \leq a \leq 0.20$ and $0.01 \leq b \leq 0.25$, and a multi-layer oxygen electrode applied to said solid electrolyte; said multi-layer oxygen electrode comprising an upper electrode layer consisting of an electronically conductive oxidic material, and
  an intermediate layer of an $Al_2O_3$-free, at least partially stabilized zirconium oxide arranged between said upper electrode layer and said solid electrolyte.

In accordance with a preferred aspect of the invention, the solid electrolyte and electrode combination further comprises an electronically conductive and oxygen-ion-conductive layer arranged between said upper electrode layer and said intermediate layer.

In accordance with a further aspect of the invention, the objects are also achieved by providing a combination comprising a solid electrolyte having a composition corresponding to the formula

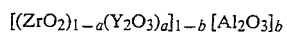
$$[(ZrO_2)_{1-a}(Y_2O_3)_a]_{1-b}[Al_2O_3]_b$$

wherein $0.03 \leq a \leq 0.20$ and $0.01 \leq b \leq 0.25$, and a multi-layer fuel cell electrode applied to said solid electrolyte, said multi-layer electrode comprising an upper gas-permeable electrode layer made of an electrically conductive ceramic/metal particle composite material comprising at least one metal selected from the group consisting of nickel and cobalt, and at least one ceramic material selected from the group consisting of doped zirconium oxide and doped ceroxide, and
  an $Al_2O_3$-free intermediate layer of an at least partially stabilized zirconium oxide interposed between said upper gas-permeable electrode layer and said solid electrolyte.

In accordance with one particularly preferred embodiment of the invention, an $Al_2O_3$-free intermediate layer made of partially or fully stabilized zirconium oxide is applied between the electrode and the solid electrolyte. This measure is based on the recognition that under the influence of the electrolysis current and the associated overvoltage, the electrode reacts with $Al_2O_3$ in the intermediate layer or the solid electrolyte, and the electric resistance therefore increases. The $Al_2O_3$-free intermediate layer according to the invention prevents this reaction, thereby increasing the durability and the length of the service life of the electrode.

An additional intermediate layer formed of a mixture of an electronically conductive material and an oxygen-ion-conductive material may also be provided to prevent the electrodes from detaching prematurely from the solid electrolyte. As a result, the durability and extended service life of the arrangement are further increased. This measure is known for a solid electrolyte without added $Al_2O_3$ from German Patent No. DE 3,611,291 C2.

In accordance with the invention, the solid electrolyte with the oxygen electrode applied to it is constructed as follows:

a) an upper layer (which represents the actual oxygen electrode) which is essentially responsible for the supply of current and which consists of an electronically conductive oxidic material;

b) under the upper layer, a first intermediate layer is arranged which comprises a mixture of an electronically conductive material and an oxygen-ion-conductive material whose mixture ratio is 90:10 to 10:90 percent by volume;

c) a second intermediate layer composed of partially or fully stabilized zirconium oxide is arranged between the first intermediate layer and the solid electrolyte;

d) the solid electrolyte has a molar composition corresponding to the formula:

$$[(ZrO_2)_{1-a}(Y_2O_3)_a]_{1-b}[Al_2O_3]_b$$

wherein $0.03 \leq a \leq 0.20$ and $0.01 \leq b \leq 0.25$.

The $Al_2O_3$-free intermediate $ZrO_2$ layer mentioned under c) prevents electrochemical interaction between the $Al_2O_3$ of the electrolyte and the oxide of the air electrode mentioned under a).

In one advantageous embodiment other rare-earth oxides, CaO or MgO may be used instead of $Y_2O_3$ in the solid electrolyte.

It is likewise possible to replace a portion of the $ZrO_2$ in the solid electrolyte with $HfO_2$.

Instead of comprising a mixture of an electronically conductive material and an ionically conductive material, the mixed-conductive intermediate layer mentioned under b) may be formed of a single-phase material which has a mixed oxygen ion and electron conductivity, i.e. which is capable of conducting both electrons and oxygen ions.

State of the art materials which intrinsically exhibit mixed electronic and ionic conductivity are composed of oxides which contain cations that have multiple valences. For example, $CeO_2$ is a suitable base material. In particular, $CeO_2$ doped with $Nb_2O_5$ is well known to show such mixed electron and ion conductivity.

In another embodiment of the invention, the oxygen electrode is constructed in two layers, and the mixed-conductive intermediate layer mentioned under b) is omitted.

The solid electrolyte with an electrode according to the invention applied to it may be used in electrolysis cells as well as in fuel cells.

In one particularly preferred embodiment, the three-layer oxygen electrode according to the invention and the associated solid electrolyte to which it is applied are constructed as follows:

1. Oxygen Electrode:
   porous mixed oxide with a perovskite structure, such as $La_{1-x}Ca_xMnO_3$, wherein $0.05 \leq x \leq 0.7$, or $La_{1-x}Sr_xMnO_3$, wherein $0.05 \leq x \leq 0.7$.

2. Mixed Conductive Intermediate Layer:
   mixture of ion-conducting material and electron-conducting material, such as $(ZrO_2)_{1-y}(Y_2O_3)_y$, wherein $0.0 \leq y \leq 0.2$, and $La_{1-x}Ca_xMnO_3$, wherein $0.05 \leq x \leq 0.5$.

3. $Al_2O_3$-Free $ZrO_2$ Intermediate Layer:
   partially or fully stabilized $ZrO_2$, for example, fully stabilized with 8 to 12 mole-% $Y_2O_3$.

4. Solid Electrolyte:
   partially or fully stabilized $ZrO_2$ with added $Al_2O_3$, for example $[(ZrO_2)_{1-a}(Y_2O_3)_a]_{1-b}[Al_2O_3]_b$, wherein $0.03 \leq a \leq 0.20$, and $0.01 \leq b \leq 0.25$.

As a result of the invention, a long service life of the oxygen electrode and a high strength of the electrolyte are achieved. At the same time, the arrangement of the invention assures that the electrolyte and the connecting material can adequately accommodate thermal expansion.

BRIEF DESCRIPTION OF THE DRAWINGS

FIG. 3 is a graph of surface resistance verses time which illustrates the long service life of the three-layer oxygen electrode according to the invention.

DETAILED DESCRIPTION OF PREFERRED EMBODIMENTS

Figure 1A:
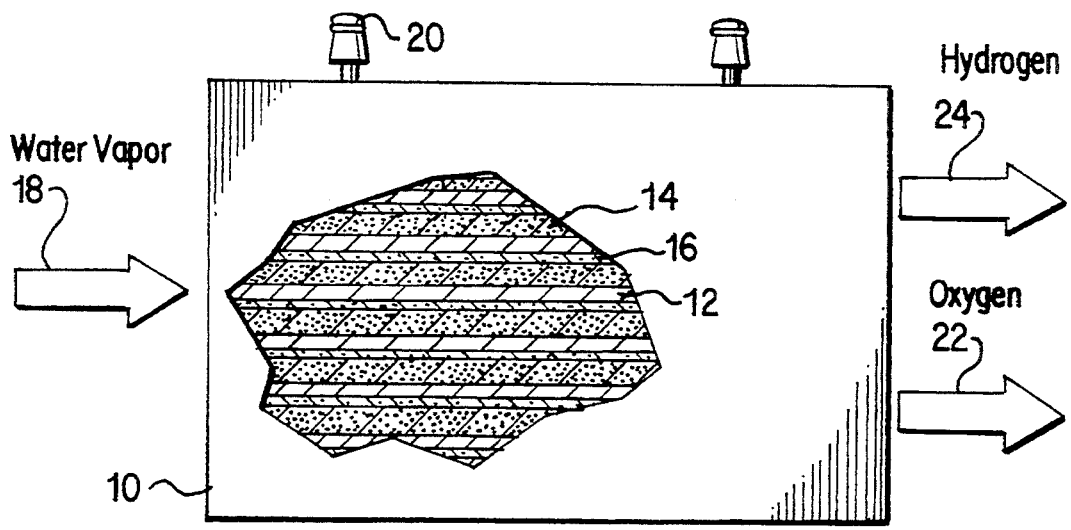
FIG. 1(a) is a schematic diagram of a high-temperature electrolysis cell showing the oxygen-ion-conducting solid electrolyte.

FIG. 1(a) shows a schematic diagram of high temperature electrolysis using an oxygen-conductive solid electrolyte. A reactor 10 is provided which contains a stacked array of solid electrolyte layers 12 and gas-permeable electrodes 14 and 16. Water vapor is introduced at one end of the reactor as indicated by arrow 18, and electrical energy is applied across the array of electrodes from electrical terminals 20. Water vapor molecules are electrolyzed to produce oxygen, which is withdrawn from the anode as indicated by arrow 22, and hydrogen, which is withdrawn from the cathode as indicated by arrow 24. At a temperature of 1000° C., the efficiency ($\eta$) is approximately 94%.

Figure 1B:
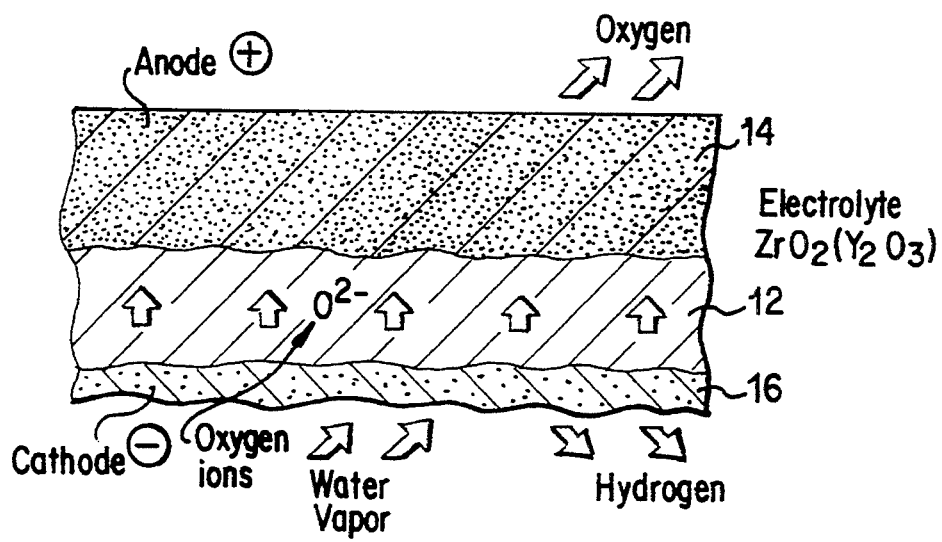
FIG. 1(b) is an enlarged view of the layers of the electrolysis cell of FIG. 1(a)

FIG. 1(b) shows an enlarged view of the stacked solid electrolyte and electrode layers. As shown in the drawing figure, oxygen ions migrate through the electrolyte from the cathode to the anode. The solid electrolyte comprises $ZrO_2$ or a mixture of $ZrO_2$ and $Y_2O_3$.

Figure 2:
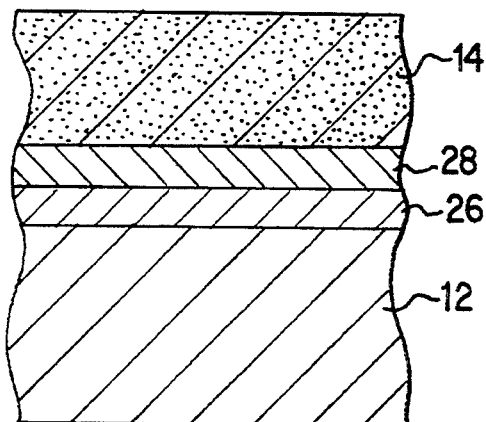
FIG. 2 is a view of a solid electrolyte with a three-layer oxygen electrode according to the invention applied thereto.

FIG. 2 shows the inventive combination of a solid electrolyte and a three-layer oxygen electrode. As can be seen from the figure, in between the solid electrolyte 12 of $ZrO_2$ with added $Al_2O_3$ and the porous oxygen electrode 14 of an oxide having a perovskite structure through which electrical energy is supplied, there is an intermediate layer of $ZrO_2$ which is free of $Al_2O_3$. Between the oxygen electrode 14 and the intermediate layer 26 there is a further intermediate layer 28 which is conductive both to electrical energy and to oxygen ions. In a particularly preferred embodiment, this further intermediate layer 28 is formed of a mixture of an electron-conducting material and an ion-conducting material.

The layers can be produced from slurries of the desired inorganic materials by any of several well known coating techniques. For example, layers may be formed by dipping the substrate in a slurry of the layer material and then sintering, by screen printing the layer material on the substrate followed by sintering, or by spraying a slurry of the coating material on the substrate and then sintering. The sintering is usually performed in air.

FIG. 3 is a graph showing a comparison of the behavior of an oxygen electrode in accordance with the present invention over an extended period of time with the behavior of a comparison electrode produced according to the state of the art without a $ZrO_2$ intermediate layer between the electrolyte and the oxygen electrode. As can be seen from the drawing, the surface resistance of the oxygen electrode according to the present invention (shown by the solid line) initially decreases and then approaches a steady value. In contrast thereto, the surface resistance of the oxygen electrode according to the prior art (shown by the broken line) increases continuously until the electrolysis device can no longer be used. Thus, solid electrolyte electrolysis units equipped with multi-layer oxygen electrodes in accordance with the presently claimed invention exhibit improved durability and longer service lives.

The invention will be described hereinafter in further detail with reference to the following examples of preferred embodiments which are merely illustrative and are not limiting on the scope of the invention.

EXAMPLE 1

The durability and length of service life of three-layer air electrodes on solid electrolytes constructed as described above in an electrolysis operation were investigated. The solid electrolyte and electrode composite comprised the following layer system:

1) a porous 90 μm thick oxygen electrode layer of $La_{0.5}Ca_{0.5}MnO_3$;

2) a porous 5 μm thick mixed conductive intermediate layer of $La_{0.5}Ca_{0.5}MnO_3/(ZrO_2)_{0.91}(Y_2O_3)_{0.09}$ at a volume mixing ratio of 1:1;

3) a dense 50 μm thick $Al_2O_3$-free intermediate $ZrO_3$ layer consisting of $(ZrO_2)_{0.91}(Y_2O_3)_{0.09}$; and 4) a 250 μm thick, absolutely gas-tight solid electrolyte layer of $[(ZrO_2)_{0.91}(Y_2O_3)_{0.09}]_{0.81}[Al_2O_3]_{0.19}$.

At 1,000° C. and with air as the operating atmosphere for the electrode, a drastically increased operating service life could be observed.

FIG. 3 shows a comparison of the specific surface resistance of a three-layer oxygen electrode according to the invention and that of an electrode with the $Al_2O_3$-free intermediate layer 3) as a function of time. The differences in the aging are apparent from the graph. The cause of the aging of the comparison electrode according to the prior art was identified as the aforementioned electrochemical reaction between the $Al_2O_3$ in the solid electrolyte and the $La_{0.5}Ca_{0.5}MnO_3$. This reaction is prevented by the intermediate layer of $Al_2O_3$-free $ZrO_2$ according to the invention.

EXAMPLE 2

The intermediate layer according to the invention which consists of partially or fully stabilized zirconium oxide may advantageously also be used in a two-layer fuel gas electrode on the aforementioned solid electrolyte. The resulting fuel cell comprises:

a) an upper gas-permeable layer made of a ceramic/metal particle composite material through which the electron current is supplied, wherein the metal consists of nickel, cobalt or mixtures thereof, and the ceramic material consists of doped zirconium oxide, ceroxide or mixtures thereof;

b) an intermediate layer of a partially or fully stabilized zirconium oxide arranged between the upper layer and the solid electrolyte;

c) a solid electrolyte having a molar composition corresponding to the formula:

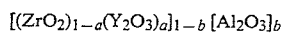
$$[(ZrO_2)_{1-a}(Y_2O_3)_a]_{1-b}[Al_2O_3]_b$$

wherein $0.03 \leq a \leq 0.20$, and $0.01 \leq b \leq 0.25$.

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all variations falling within the ambit of the appended claims and equivalents thereof.

What is claimed is:

1. In combination, a solid electrolyte for high-temperature electrolysis having a molar composition corresponding to the formula:

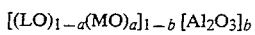
$$[(LO)_{1-a}(MO)_a]_{1-b}[Al_2O_3]_b$$

wherein LO represents $ZrO_2$, $HfO_2$ or a mixture of $ZrO_2$ and $HfO_2$, MO represents an oxide selected from the group consisting of CaO, MgO and rare earth oxides, and $0.03 \leq a \leq 0.20$ and $0.01 \leq b \leq 0.25$, and a multi-layer oxygen electrode applied to said solid electrolyte; said multi-layer oxygen electrode comprising
   an upper electrode layer consisting of an electronically conductive oxidic material;
   a first intermediate layer of an electronically conductive and oxygen-ion-conductive material arranged below said upper electrode layer, and
   a second intermediate layer consisting essentially of an $Al_2O_3$-free, ion-conductive, at least partially stabilized zirconium oxide arranged between said first intermediate layer and said solid electrolyte.

2. A combination according to claim 1, wherein said electronically conductive and oxygen-ion-conductive layer comprises a mixture of an electronically conductive material and an oxygen-ion-conductive material at a volume mixing ratio of from 90:10 to 10:90.

3. A combination according to claim 1, wherein said electronically conductive and oxygen-ion-conductive layer comprises a single-phase material which exhibits both oxygen ion conductivity and electron conductivity.

4. A combination according to claim 1, wherein said zirconium oxide in said second intermediate layer is fully stabilized.

5. A combination according to claim 1, wherein said solid electrolyte corresponds to the formula

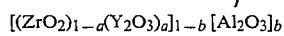

wherein $0.03 \leq a \leq 0.20$ and $0.01 \leq b \leq 0.25$.

6. A combination according to claim 1, wherein MO in the solid electrolyte represents CaO, MgO or a rare-earth oxide other than $Y_2O_3$.

7. A combination according to claim 1, wherein LO in the solid electrolyte represents $ZrO_2$.

8. A combination according to claim 1, wherein LO in the solid electrolyte represents a mixture of $ZrO_2$ and $HfO_2$.

9. In combination, a solid electrolyte having a composition corresponding to the formula

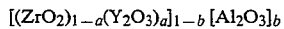

wherein $0.03 \leq a \leq 0.20$ and $0.01 \leq b \leq 0.25$, and a multi-layer fuel cell electrode applied to said solid electrolyte, said multi-layer electrode comprising an upper gas-permeable electrode layer made of an electrically conductive ceramic/metal particle composite material comprising at least one metal selected from the group consisting of nickel and cobalt, and at least one ceramic material selected from the group consisting of doped zirconium oxide and doped ceroxide;

a first intermediate layer of an electronically conductive and oxygen-ion-conductive material arranged below said upper electrode layer, and an $Al_2O_3$-free second intermediate layer consisting essentially of an at least partially stabilized, ion conductive zirconium oxide interposed between said first intermediate layer and said solid electrolyte.

* * * * *